W. RICE.
GLUE OR LIKE POT.
APPLICATION FILED NOV. 19, 1913.

1,135,466.

Patented Apr. 13, 1915.

Witnesses
G. M. Spring
C. H. Crawford

Inventor
Wentworth Rice,
By
Richard Bowen,
his Attorney

UNITED STATES PATENT OFFICE.

WENTWORTH RICE, OF SALT LAKE CITY, UTAH.

GLUE OR LIKE POT.

1,135,466.   Specification of Letters Patent.   Patented Apr. 13, 1915.

Application filed November 19, 1913. Serial No. 801,981.

*To all whom it may concern:*

Be it known that I, WENTWORTH RICE, a citizen of the United States, residing at Salt Lake City, in the county of Salt Lake and State of Utah, have invented certain new and useful Improvements in Glue or like Pots, of which the following is a specification.

My invention relates to improvements in glue pots more especially, and one of the objects is to provide an improved form of glue-pot structure which will maintain the glue at a uniform consistency and reduce, to a minmum, the scum which usually rises to the surface on the boiling glue and which coagulates on the surface after the glue is allowed to stand.

A further object is to provide an improved glue pot in which the steam from the water or boiler pot is directed against the side or inner face of the upper margin of the glue pot so as to prevent the glue from adhering thereto thereby preventing such glue from becoming burnt and resulting in waste.

Further novel objects relate to details of construction which will be more fully described in connection with the accompanying drawing and which will be more particularly pointed out and ascertained in and by the appended claims.

Figure 1:
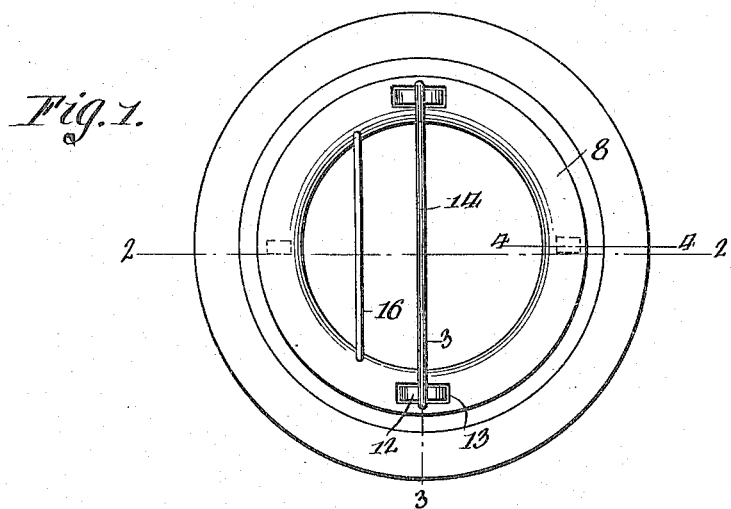
Figure 2:
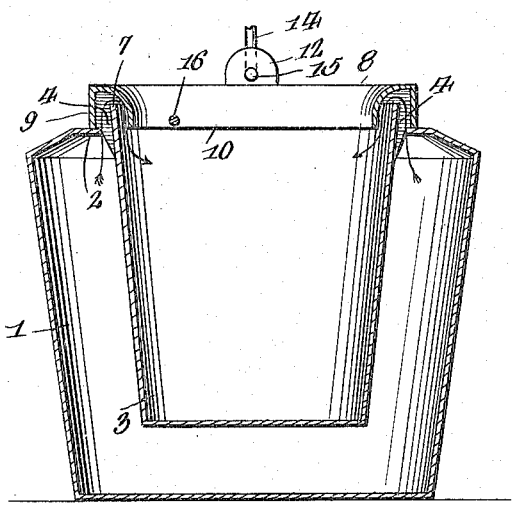
Figure 3:
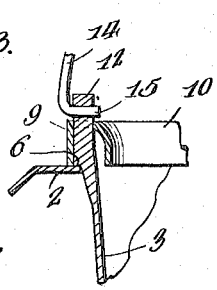
Figure 4:
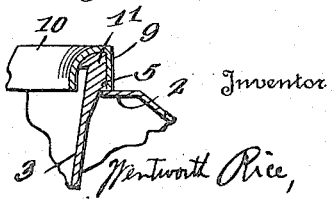

In the drawing: Figure 1 is a plan view of a glue pot embodying one form of my invention. Fig. 2 is a sectional view on line 2—2 of Fig. 1. Fig. 3 is a sectional view on line 3—3 of Fig. 1. Fig. 4 is a sectional view on line 4—4 of Fig. 1.

Like characters of reference designate similar parts throughout the different figures of the drawing.

As illustrated, 1 designates an outer or boiler pot for the hot water and said pot is provided with an overhanging glue-pot supporting rim 2.

A glue pot is designated at 3 and is proportioned to fit in the water or boiler pot 1 to be subjected to the heat in the water pot and provide for a space 4 between the supporting rim 2 and the glue pot 3, as clearly shown in Fig. 2. The glue pot 3 and the water pot 1 have supporting portions for supporting the glue pot in the position shown in Fig. 2, and as illustrated, I provide the glue pot with shoulders 5 and 6 for engaging the rim 2, as illustrated more particularly in Figs. 3 and 4. Thus I support the upper margin or rim 7, of the glue pot 3, slightly above the rim 2 of the water pot 1.

One of the features of my invention consists in the provision of means for deflecting the steam egressing from the water pot 1, over the margin 7 of the glue pot 3 and downwardly into the glue pot 3 along the inner wall thereof, as indicated by the arrows shown in Fig. 2. I have shown such means in the form of an annular shield 8 which is provided with an outer wall 9 adapted to be supported on the rim 2, and an inner wall 10 which overhangs the inner face of the glue pot 3 in spaced relation therewith, and which projects downwardly into the glue pot 3, as clearly shown in Fig. 2. At Fig. 4, enlargements 11 serve to engage and support the inner face of the shield 8, and I prolong the shoulders 6 to form bail ears 12 which project through suitable openings 13, in the shield 8, for attachment of said ears of a glue-pot bail 14. Thus the shield will be held upon the glue pot by the ends 15 of the bail 14. A suitable brush-wiping rod 16 is mounted upon the shield so that excess glue can be wiped off on the rod 16 from the brush so it will fall into the contents of the glue pot 3.

It will be readily seen that steam entering the pot marginally thereof will moisten the glue and prevent the same from adhering to the sides of the glue pot near the upper margins thereof when the pot is in use. Thus a most effective application of steam is applied annularly to the contents of the pot 3. In cooking the glue, I may employ a cover so as to subject all of the upper surface of the contents of the pot to the action of steam.

It is believed that the advantages and utility of my improved glue pot will be clearly understood from the foregoing description and while I have herein shown and described one specific form of my invention, I do not wish to be limited thereto except for such limitations as the claims may import.

I claim:—

1. In a glue-pot structure, an outer water pot and an inner glue pot, said pots having portions for supporting the glue pot in exteriorly spaced relation inside of the water pot for egress of steam from the latter, and means for directing the steam discharging from the water pot over the margin of and downwardly into the glue pot, substantially as described.

2. In a glue-pot structure, an outer water pot and an inner glue pot, said pots having coacting portions for supporting the glue pot in exteriorly spaced relation inside of the water pot, and an annular shield for directing the steam from the water pot over the margin of and downwardly adjacent the inside of the wall of the glue pot, substantially as described.

3. In a glue pot structure, an outer water pot and an inner glue pot, said pots having coacting portions for supporting the glue pot in exterior annular spaced relation inside of the water pot for egress of the steam from the latter, and an annular shield having one wall portion engaging the water pot outside of the space therebetween and the glue pot and another wall portion overhanging and extending downwardly inside of the glue pot for deflecting the steam from the water pot over into and downwardly inside of the margin of the glue pot, substantially as described.

4. In a glue-pot structure, a water pot having an open top and an overhanging supporting rim, a glue pot proportioned to fit in said water pot in exterior spaced relation with respect to said rim and provided with bail ears having shoulders engaging said rim and supporting said glue pot in said water pot, an annular shield overhanging said pot to direct the steam from said water pot into said glue pot and having openings for projection of said ears through said shield, and a bail for said glue pot having end portions connected with said ears to retain said shield in place on said glue pot, substantially as described.

5. In a glue-pot structure, a water pot having an open top and an overhanging supporting rim, a glue pot proportioned to fit in said water pot in exterior spaced relation with respect to said rim and provided with bail ears having shoulders engaging said rim and supporting said glue pot in said water pot, an annular shield overhanging said pot to direct the steam from said water pot into said glue pot and provided with openings for projection of said ears through said shield, a bail having end portions connected with said ear and retaining said shield upon said glue pot, and said glue pot having enlargements engaging said shield to support the same on said glue pot, substantially as described.

6. In a glue pot structure, a water pot having an open top and an overhanging supporting rim, a glue pot proportioned to fit in said water pot in spaced relation with respect to the said rim, diametrically opposed shoulders formed on the rim of said glue pot to engage the rim of said water pot in supporting the former within the latter, enlargements formed on said shoulders, an annular shield overhanging said pot to direct the steam from said water pot into said glue pot provided with diametrical openings and supported by said enlargements, bail ears also formed with shoulders engaging said water pot rim and projecting through said openings, and a bail having end portions connected with said ears and retaining said shield on said glue pot, substantially as described.

In testimony whereof I affix my signature in presence of two witnesses.

WENTWORTH RICE.

Witnesses:
H. W. AIREY,
H. H. HEMPSTEAD.

Copies of this patent may be obtained for five cents each, by addressing the "Commissioner of Patents, Washington, D. C."